June 29, 1926.　　　　J. WAHL ET AL　　　1,590,919

GAUGE

Filed July 5, 1924

INVENTORS:
John Wahl and
Otto Melzer,
By Attorneys,
Fraser, Myers & Manley

Patented June 29, 1926.

1,590,919

UNITED STATES PATENT OFFICE.

JOHN WAHL AND OTTO MELZER, OF BROOKLYN, NEW YORK, ASSIGNORS TO A. SCHRAEDER'S SON, INC., OF BROOKLYN, NEW YORK, A CORPORATION OF NEW YORK.

GAUGE.

Application filed July 5, 1924. Serial No. 724,359.

This invention relates to pressure gauges and aims to provide certain improvements therein.

The invention is particularly directed to pressure gauges of the telescoping indicating sleeve type, wherein the indicator sleeve which has calibrated pressure markings thereon is moved outwardly into indicating position by a plunger attached to the outer end of a loading spring, the inner end of which is connected with the casing. The plunger is normally in contact with the top of an extensible sleeve which is moved outwardly by fluid pressure upon its admission to the gauge, and the loading spring is so proportioned with relation to the extensible sleeve that it expands substantially uniformly therewith. In testing gauges of this type after assembling, it is frequently found that the indicating member is projected outwardly, either a greater or lesser distance than the calibrated scale markings warrant for a given pressure, and to remedy this, a different extensible sleeve must be substituted for the one in the gauge. This necessitates the removal of the gauge foot portion and other elements, all of which consumes considerable time.

According to the present invention, we provide means whereby the gauge after assembling may be adjusted from the exterior thereof without the substitution of parts. We accomplish this through the medium of adjusting means, which are preferably screw-threaded, whereby the normal relative positions of the plunger and the top of the indicating sleeve may be varied and then locked in the adjusted position. Another feature of the present invention resides in providing a pressure gauge wherein the interior mechanism of the gauge or "gauge insides" comprising the pressure responsive means, the press-on seat and tire valve depressor may be first assembled and then introduced into the gauge housing as a unit, thus greatly facilitating the assembling of the gauges. The invention also includes other features of improvement which will be hereinafter more fully described.

Referring to the drawings wherein we have shown certain preferred embodiments of my invention,—

Figure 1:
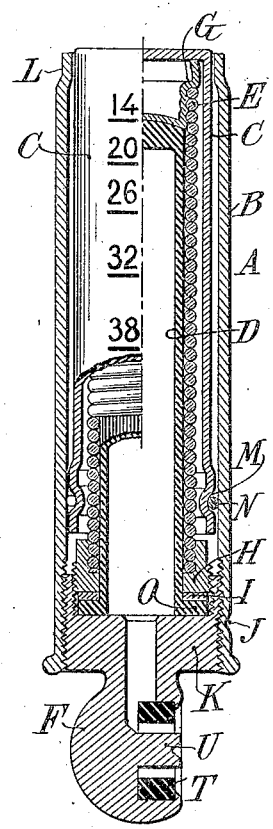
Figure 1 is a longitudinal section of a gauge embodying the present invention.
Figure 2:
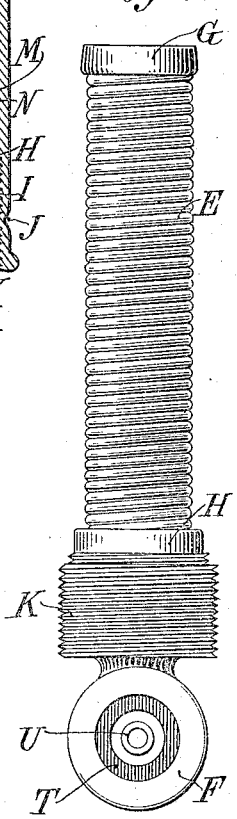
Fig. 2 is an elevation of the pressure gauge interior mechanism or insides of the gauge shown in Figure 1.

Referring first to Figs. 1 and 2, let A indicate a tire pressure gauge as a whole which comprises a cylindrical casing B, a telescoping indicating sleeve C, an elastic thimble D, a loading spring E surrounding the thimble, and a foot portion F. Normally seating against, but disconnected from the outer end of the thimble D is a cup-shaped plunger G preferably formed of sheet metal, a portion thereof being externally threaded to receive the convolutions of the outer end of the loading spring E, the inner end of said spring being received and held by an internally threaded sleeve H which serves to anchor the spring to the casing. The bottom face of the sleeve H rests against a metal washer I which in turn seats upon a lateral flange J formed on the elastic thimble, and which is compressed between the sleeve H and a plug K of the foot portion to provide a leak-tight seal between said parts. The outer end of the casing B is turned or spun inwardly as shown at L to provide a guide and limiting stop shoulder for the telescoping sleeve C which has its lower end formed with a groove M in which seats a split spring ring N adapted to frictionally engage the inner wall of the casing B to hold the indicating sleeve in indicating position after the thimble D, loading spring E, and plunger G have returned to normal position, after moving the indicating sleeve outwardly. The parts thus far described are those common to the standard tire pressure gauge of the telescoping sleeve type now in general use.

In this type of gauge the indicating sleeve is provided with a carefully calibrated scale, and the plunger which moves the indicating sleeve outwardly is normally in contact with the top of the elastic sleeve, which is moved outwardly by fluid pressure upon its admission to the gauge, and the loading spring is so proportioned with relation to the extensible elastic sleeve that it expands substantially uniformly therewith, hence proper registering of pressure is dependent upon the normal relative positions of the plunger and the top of the indicating sleeve. In testing gauges of this type after assembling it is frequently found that the indicating member is projected outwardly either a greater or lesser distance than the calibrated scale markings warrant for a given test pressure, due mainly to slight differences in the lengths of the elastic thimbles and also in the effective lengths of the loading springs which give rise to slight variations in the relative normal positions of the plunger with respect to the top of the indicating sleeve. To remedy this condition a different extensible sleeve is usually substituted for the one in the gauge, which of course necessitates the disassembling of the interior mechanism of the gauge or gauge insides.

According to the present invention these slight differences may be compensated for after the gauge parts have been assembled, by adjusting means operable from the exterior of the gauge. The adjusting means are adapted to vary the normal relative positions of the plunger and top of the indicating sleeve, such initial adjustment not affecting the subsequent extension of the loading spring.

In Figure 1 the adjustment is accomplished by a screw plug K being moved into the casing a greater or lesser extent, after which adjustment the casing and plug are indented, for example, with a center punch as shown at O to prevent altering said adjustment.

Figure 3:
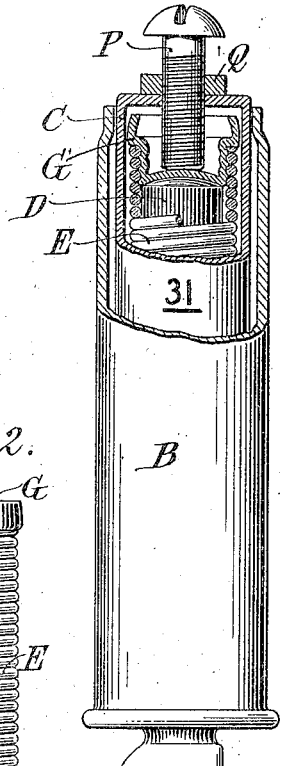
Figs. 3 and 4 show views partly in elevation and partly in longitudinal section of modified forms of the invention.

In Fig. 3 the adjustment between the plunger G and the top of the telescoping sleeve C is controlled by a screw P passing through the top of the telescoping sleeve and adapted to engage the bottom of the plunger to move the sleeve outwardly. The adjustment after once made may be locked against accidental shifting by a lock nut Q on the screw P.

Figure 4:
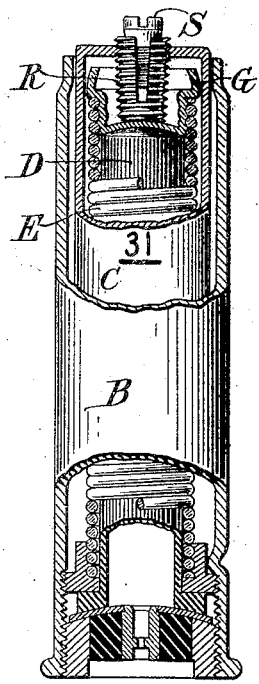
Figure 5:
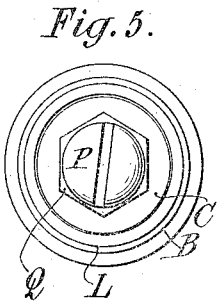
Figs. 5 and 6 are top plan views of Figs. 3 and 4 respectively.
Figure 6:
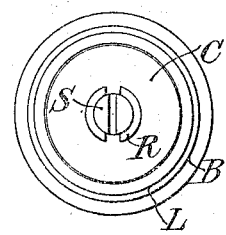

In Fig. 4 the adjusting means is in the form of a split screw-threaded sleeve R passing through the top of the indicating member and a wedging screw S entering the top of the split sleeve and adapted to lock it through a wedging action in any adjusted position.

The gauges to which the present invention is applicable may be of various forms, for example, in Figs. 1 and 3 the foot portion F is formed with a press-on seat T and a tire valve depresser U arranged at right angles to the longitudinal axis of the gauge, and thereby adapt the gauge for ready application to tire valves on spring wheels and heavy truck wheels. In Fig. 4 we have shown the invention applied to a gauge provided with a standard foot portion.

In Figs. 1 and 2 the adjustment of the gauge is dependent upon movement of the plunger through bodily movement of the pressure gauge insides and to facilitate this movement the interior mechanism of the gauge or gauge insides are adapted to be first assembled and then introduced into the gauge housing as a unit. To render this possible the sleeve H, washer I, and the lower portion of the thimble D are all carried by the plug K, which is formed on its upper face with a recess accommodating said parts, an external thread on the sleeve H engaging an internal thread on the plug K serving to maintain said parts in assembled relation.

Having thus described the invention, let it be assumed that the gauge is assembled and that it is subjected to a test pressure of fifteen pounds, and it is found that the indicating sleeve is moved outwardly to a point indicating fourteen pounds. This indicates that the indicating sleeve must be raised with respect to the plunger a distance corresponding to that between the indications 14 and 15. In the gauge of Figure 1 this is accomplished by screwing the plug K slightly farther into the casing B. In Figs. 3 and 4 this in accomplished by threading the screw P and sleeve R inwardly, respectively, a slight distance. If, on the other hand, upon applying a pressure of fifteen pounds to the gauge, the indicating sleeve is moved to a point corresponding to sixteen pounds, then adjustment is made as in the preceding manner, but in the reverse direction. It is to be understood, however, that after adjustment the adjusting means are locked against accidental displacement.

While we have shown and described certain embodiments of my invention, it will be understood that certain changes may be made therein without departing from the spirit thereof.

What we claim is:

1. A pressure gauge comprising a casing, a pressure responsive member, a pressure indicating member movable by but disconnected from the pressure responsive member, one of said members having a calibrated scale and means for adjusting the normal zero position of the indicating member from the exterior of the casing for proper registering of pressure after the gauge parts have been assembled.

2. A pressure gauge comprising a casing, a pressure responsive member within the casing, a pressure indicating member telescopically mounted with respect to said casing and movable by but disconnected from the pressure responsive member, one of said members having a calibrated scale and means for adjusting the normal zero position of the indicating member from the exterior of the casing for proper registering of pressure after the gauge parts have been assembled.

3. A pressure gauge comprising a pair of telescoping members, one of which has mounted therein pressure responsive means for moving the other member outwardly with respect to the first, the exterior of one of said members having a calibrated scale thereon adapted to cooperate with one edge of the other member to indicate pressure, and means on one of the telescoping members operable from the exterior of the said members after the gauge parts have been assembled for adjusting the normal position of the top of the movable member with respect to the pressure responsive means to insure proper registering of pressures.

4. A tire pressure gauge comprising an elongated casing, an indicting member telescoping with said casing, anchoring means and a plunger within the casing, pressure responsive means within said casing comprising a loading spring one end of which is anchored to the casing through said anchoring means and the other end connected to the plunger which is adapted to move the indicating member outwardly, and means operable from the exterior of the casing after the gauge parts have been assembled, for adjusting the normal position of the top of the indicating member with respect to the plunger to insure proper registering of pressure.

5. A tire pressure gauge comprising an elongated casing, an indicating member telescoping with said casing, anchoring means and a plunger within the casing, pressure responsive means within said casing comprising a loading spring one end of which is anchored to the casing through said anchoring means and the other end connected to the plunger which is adapted to move the indicating member outwardly, the anchoring means of the loading spring being adapted to adjust the normal relative position of the plunger and the indicating member to insure proper registering of pressure.

6. A tire pressure gauge comprising an elongated casing, an indicating sleeve telescoping therewith and interior mechanism of the pressure gauge within the casing, said interior mechanism comprising a fluid pressure chamber, a loading spring, means for anchoring the spring to the casing, a press-on seat and a tire valve depressor, said interior mechanism of the gauge being insertable into the casing as a unit and adapted to be held therein by the anchoring means.

7. A tire pressure gauge comprising an elongated casing, an indicating sleeve telescoping therewith and interior mechanism of the pressure gauge within the casing, said interior mechanism comprising an elastic thimble, a loading spring surrounding the thimble, anchoring means for the spring carried by a screw-threaded plug, a press-on seat and a tire valve depressor, said interior mechanism of the gauge being insertable into the casing as a unit and adapted to be held therein by the anchoring means.

8. A tire pressure gauge comprising a screw-threaded plug provided at one end with a press-on seat and tire valve depressor and at its other end with an internally threaded recess, an elastic thimble having a flange at its lower end seating in said recess, a loading spring surrounding said thimble, a movable part to which the outer end of the spring is attached, a threaded sleeve to which the inner end of the spring is attached, said sleeve engaging in the recess in the plug and having a flange seating against the flange on the thimble compressing the latter to provide a leak-tight seal between the plug and thimble.

9. A tire pressure gauge comprising a housing consisting of a casing and a telescoping indicating sleeve and a pressure gauge interior mechanism, comprising a part for moving the indicating sleeve into indicating position, a pressure responsive means and a plug adjustable within the bottom of the casing, adjustment of the plug into the casing serving to set the gauge for proper registering of pressure and means for holding the plug in adjusted position within the casing.

10. A tire pressure gauge comprising a housing consisting of a casing and a telescoping indicating sleeve and a pressure gauge interior mechanism, comprising a part for moving the indicating sleeve into indicating position, a pressure responsive means and a plug adjustable within the bottom of the casing, adjustment of the plug into the casing serving to set the gauge for proper registering of pressure, the plug and casing being provided with engaging screw threads and means for holding the plug in adjusted position within the casing.

In witness whereof, we have hereunto signed our names.

JOHN WAHL.
OTTO MELZER.